United States Patent Office 3,651,019
Patented Mar. 21, 1972

3,651,019
PRODUCTION OF ADDUCTS OF CARBON TETRA-
CHLORIDE OR CHLOROFORM WITH OLEFIN-
ICALLY UNSATURATED SUBSTANCES
Meir Asscher, Rehovoth, Aharon Katchalsky, Tel-Aviv,
and David Vofsi, Rehovoth, Israel, assignors to Yeda
Research & Development Company Ltd., Rehovoth,
Israel
No Drawing. Continuation-in-part of applications Ser. No.
223,543 and Ser. No. 233,549, both Sept. 13, 1962. This
application July 27, 1965, Ser. No. 475,274
Claims priority, application Israel, Sept. 28, 1961,
16,079, 16,080
Int. Cl. C07c 121/06, 21/04
U.S. Cl. 260—77.2
8 Claims

ABSTRACT OF THE DISCLOSURE

A process for the production of 1:1 adducts of carbon tetrachloride or chloroform with olefinically unsaturated compounds in the presence of iron or copper compound catalysts, which are at least partially in reduced valence states.

---

This application is a continuation-in-part of copending applications Ser. Nos. 223,548 and 223,549, each of which applications was filed on Sept. 13, 1962 and each of which is now abandoned.

This invention relates to a process for the production of adducts of halogenated organic compounds with olefinically unsaturated substances, and to certain of the adducts thus formed. More particularly, the invention relates to a process for reacting halogenated compounds, viz., carbon tetrachloride or chloroform, with olefinically unsaturated materials to provide products containing predominant proportions of 1:1 adducts of such materials.

The term 1:1 adducts, as used herein, refers to the chlorinated addition products of carbon tetrachloride or chloroform with olefinic materials which are chlorinated across their double bonds in the sense —$CCl_3$, —Cl, in the case of carbon tetrachloride adduction, or —$CHCl_2$, —Cl, in the case of chloroform adduction.

It is known to effect the addition of carbon tetrachloride or chloroform to olefinically unsaturated materials in the presence of free radical catalysts, e.g., peroxides. Kharasch, Jensen and Urry (J.A.C.S, 1947, 69, 1100) have postulated that, in carbon tetrachloride adduction, a free-radical chain mechanism having the following propagation steps is carried out:

(1) —$CCl_3$ + $CHR$=$CHR'$ → $CCl_3$—$CHR$—$CHR'$—

(2) $CCl_3$—$CHR$—$CHR'$ + $CCl_4$ →
$CCl_3$—$SCHR$—$CHR'Cl$ + —$CCl_3$ (3) $CCl_3$—$CHR$—$CHR'$— + $CHR$=$CHR'$ →
$CCl_3$—$CHR$—$CHR'$—$CHR$—$CHR'$—, etc.

When carbon tetrachloride is thus added to certain terminal olefins, e.g., aliphatic mono-olefins such as propene-1, isobutene or octene-1, the corresponding 1,1,1,3-tetrachloro-derivatives (1:1 adducts) and telomers are produced in accordance with Equations 1, 2 and 3. On the other hand, in the case of most polymerizable vinyl unsaturates, such as styrene, butadiene, acrylonitrile, or the acrylates, step (3) predominates over step (2) to the extent that α,α,α,ω-tetrachloro substituted polymers are obtained, even when ratios of carbon tetrachloride to the olefinically unsaturated material as high as 100 to 1 are employed.

The behavior of ethylene is intermediate that of the non-polymerizable, aliphatic mono-olefins and the polymerizable vinyl monomers. Hence, when carbon tetrachloride is added to ethylene in the presence of a peroxide catalyst, mixtures of telomers having the formula

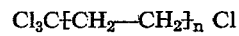

where $n$ may vary from about 2 to 20 may be produced. In such instance, the proportion of 1:1 adduct in the telomeric product mixture is usually quite small, in one reported instance of the order of 5% (Siclaria et al., Australian Pat. No. 244,066).

In the case of chloroform adduction, a different mechanism has been proposed involving the addition of —$CCl_3$ and —H across the double bond, as the radical formed in step (4) below abstracts hydrogen from the chloroform reactant:

(4) $Cl_3C$— + R—$CH$=$CHR'$ → $CCl_3$—$CHR$—$CHR'$—

(5) $CCl_3$—$CHR$—$CHR'$— + $CHCl_3$ →
$CCl_3$—$CHR$—$CH_2R'$ + $CCl_3$—

The peroxide catalyzed reaction thus produces saturated products having terminal trichloromethyl groups.

In contrast, and as described more fully hereinafter, the method of the present invention results in the addition of —Cl and —$CHCl_2$ across the double bond in improved selectivity, whereas the peroxide process adds —H and —$CCl_3$ across the same double bond.

It is most desirable to produce 1:1 adducts of carbon tetrachloride and various olefinically unsaturated materials without the necessity for, and substantial expense of, separating such products from telomeric materials with which, as indicated above, they have frequently been co-produced. Numerous of such 1:1 adducts have known utility. Hence, the 1:1 adduct of carbon tetrachloride with styrene (U.S. Pat. No. 2,606,213 of Aug. 5, 1952), and carbon tetrachloride with allyl alcohol (U.S. Pat. No. 2,568,859 of Sept. 25, 1951), have been described as pesticides. Similarly, the 1:1 adduct of butadiene may be utilized as an intermediate for the production of other pesticides (Pyne, J. Org. Chem. 27, p. 3483, 1962). Additionally, the 1:1 adduct of carbon tetrachloride and acrylonitrile can be used as an intermediate in the manufacture of tetrachlorobutyric acid, a lube-oil additive.

The utility of various other 1:1 adducts of carbon tetrachloride and olefinically unsaturated materials has been described in the literature. Hence, French Pat. No. 136,094 of June 5, 1964 refers to 1,1,1,3-tetrachloropropane as a paint remover and degreasing agent, U.S. Pat. No. 2,658,-930 of Nov. 10, 1953 discloses 1,1,1,3-tetrachlorononane as an intermediate in the production of long-chain, chlorine-containing aliphatic carboxylic acids and U.S. Pat. No. 3,085,885 of Apr. 16, 1963 refers to such adducts of carbon tetrachloride and camphenyl acetate as non-hydrolyzing, fire-retardant plasticizers for plastics.

Moreover, as discovered in accordance with the present invention and as set forth more fully hereinafter, the addition products derived from certain unsaturated rubbers possess marked utility as bases for paints and in various adhesive formulations.

The 1:1 adducts of chloroform and various olefinically unsaturated materials, possessing pendant dichloromethyl groups, also have marked commercial importance as compared with those adducts produced by heretofore known peroxide catalysis, possessing pendant trichloromethyl groups. Such 1:1 addition products may be utilized as intermediates in the production of the corresponding alpha, beta-unsaturated aldehydes, e.g., by initially reacting the chloroform unsaturated material adducts with alcoholic sodium hydroxide or sodium ethoxide, and by subsequent acid hydrolysis (Kharasch et al., J. Org. Chem. 13, p. 898, 1948); or by reaction of the chloroform adduct with a secondary amine, followed by acid hydrolysis (Kerfanto, Comp. rend. 252, p. 3457, 1961). Various of the alpha,beta-unsaturated aldehydes thus produced have known utility in perfumes. Additionally, 3-methyl-butene-2-al, the unsaturated aldehyde corresponding to the adduct of chloroform and isobutene (1,1,1,3-trichloro-6-methylbutane) is known to be useful in the synthesis of isoprenoid unsaturated higher aldehydes, such as dehydrocitral (Fischer et al., Ber., 68, p. 1728, 1935); and for the synthesis of carotenoids and compounds having vitamin A activity including vitamin A itself (Kuhn et al., Ber., 70, p. 853, 1937). Moreover, pentene-2-al, the alpha, beta-unsaturated aldehyde corresponding to the chloroform adduct of butene-1, has known utility as an intermediate in the synthesis of higher aldehydes and acids (Kuhn et al., Ber., 70, p. 1898, 1937).

Halogenated materials possessing terminal dichloromethyl groups are additionally useful as intermediates in the preparation of acetylene derivatives, which may be produced therefrom by dehydrohalogenation (Hill et al., J.A.C.S., 50, p. 172, 1928). Various of such acetylene derivatives, e.g., vinylacetylene, are important intermediates in the manufacture of synthetic rubbers.

Peroxide catalyzed free radical addition reactions are not, as indicated hereinabove, generally suitable for the commercial production of the desirable 1:1 addition products mentioned. Moreover, such free radical catalyzed reactions are relatively costly to carry out, involve certain risks of runaway reaction, and may result in the undesired formation of polymers. Thus, it has heretofore been necessary to employ relatively complex and indirect syntheses to produce various of such products. Alternatively, highly uneconomical dilute systems must be used to obtain reasonable yields of 1:1 adduct.

It is accordingly among the objects of the present invention to provide a generally applicable process for the production of 1:1 adducts of olefinically unsaturated substances with carbon tetrachloride or chloroform.

A further object of the invention is to provide such a process which may be economically carried out in commercial operations, and which selectively produces the desired 1:1 adducts in predominant proportions, if not exclusively.

Yet an additional object of the invention is to provide carbon tetrachloride adducts of natural and synthetic rubbers, which adducts possess high chlorine contents and provide non-brittle, stable, non-flame supporting films useful in paints and adhesive formulations.

The nature and objects of the invention will be more fully apparent from a consideration of the following detailed description thereof.

In accordance with the present invention, a process is provided for the production of 1:1 adducts of carbon tetrachloride or chloroform with olefinically unsaturated substances which results in the formation of a product comprising a predominant proportion, preferably more than about 70%, of the desired 1:1 adduct. Such a process involves reacting the carbon tetrachloride or chloroform reactant or addend with an olefinically unsaturated substance, in the proportion of from about 0.05 to 20 moles of the carbon tetrachloride or chloroform per mole of the olefinically unsaturated substance, at temperatures of from about 20° to 300° C., in a substantially homogeneous reaction medium having a novel catalyst composition dissolved therein. The catalyst comprises a dissolved copper or iron compound which is at least partially maintained in the reaction medium in its reduced valence state.

It has been found that, by conducting the addition reaction in the presence of at least partially reduced copper or iron compounds, surprisingly high yields of 1:1 adducts may be produced. Moreover, apart from yields, the desired 1:1 adducts are, by proceeding in accordance with the process hereof, selectively formed to the substantial exclusion of any telomeric products. In the present specification and the claims appended hereto, the selective formation of 1:1 adducts is described by means of the "Selectivity," a datum which shall be defined as the percentage by weight of 1:1 adduct formed, based on the weight of the total reaction product.

It is highly advantageous, in order to produce the 1:1 adduction of the invention, to conduct the addition reaction in a substantially homogeneous reaction medium containing the copper or iron compound catalyst, which compound must be dissolved in the medium and exist at least partially in the reduced valence state, i.e., as cuprous or ferrous ions, complexes or compounds. While the copper or iron compound catalyst may exist entirely in its reduced valence state, it has been found that the unexpected results of the present invention are achieved when even as little as 1% by weight of such compound exists in its reduced state. On the other hand, when metal compounds other than the iron or copper catalysts are incorporated in the reaction medium, e.g., compounds of Ni, Cr, Sn, Zn, Al or Ag, predominantly 1:1 adduction does not result. Moreover, even when the iron or copper compound catalysts hereof are used, in a heterogeneous system predominant production of 1:1 adducts is not effected, complex telomeric mixtures of chlorinated addition products generally being formed.

Thus, when olefinically unsaturated compounds, containing any number of unconjugated double bonds per molecule are reacted with the addend $CXCl_3$, in which X is hydrogen or chloro (viz, chloroform or carbon tetrachloride), in accordance with the present method, the products formed contain predominant proportions of adducts incorporating the elements of one molecule of the adducted $CXCl_3$ per reacted double bond, the adduction across the double bond being described by the formula

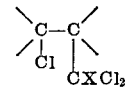

In the case of compounds containing one or several conjugated double bond systems per molecule, one molecule of addend $CXCl_3$ will, according to the present invention, undergo adduction per each pair of conjugated double bonds reacted. In this adduction the elements of the addend $CXCl_3$ may be attached to the conjugated pair of double bonds either in a 1–2 or in a 1–4 fashion, as exemplified by the formulae

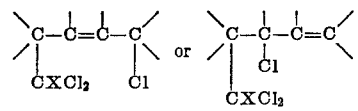

It is believed that 1:1 adduction results, rather than telomerization in the case of reaction with carbon tetrachloride or in the addition across the double bond in the form —$CCl_3$, and —H in the case of reaction with chloroform, because of a reduction-oxidation mechanism which we have termed "redox transfer." (Asscher et al., J. Chem. Soc., pp. 1887–1896, pp. 3921–3927, 1963.) Thus, when carbon tetrachloride addition is effected, employing the process hereof, the radical displacement or "transfer" reaction of Equation 2 above is superseded by the following reduction-oxidation (redox-transfer) steps:

(6)

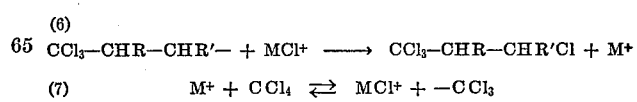

(7) $\quad M^+ + CCl_4 \rightleftarrows MCl^+ + {-}CCl_3$ wherein $M^+$ represents cuprous or ferrous species and $MCl^+$ designates cupric or ferric species with at least one chlorine ligand in the coordination shell. It may be seen that the cuprous or ferrous species thus functions as a chlorine-atom transfer agent.

In the case of chloroform adduction it is believed that, in place of the free radical mechanism postulated in Equations 4 and 5 above, chlorine-activation is effected by the following propagating sequence:

(8) $\quad M^+ + CHCl_3 \rightleftarrows MCl^+ + CHCl_2-$ (9) $\quad CHCl_2- + R-CH=CHR' \longrightarrow CHCl_2-CHR-CHR'-$

(10) $\quad CHCl_2-CHR-CHR'- + MCl^+ \longrightarrow CHCl_2-CHR-CHR'Cl + M^+$

It may be seen that the addition of chloroform in the sense $CHCl_2-$, $Cl-$ is thus effected, the resulting adduct having a pendant dichloromethyl group.

It will be appreciated that the preceding description is solely intended as a proposed explanation for the unexpected results of the present invention, and that the invention should not be construed as restricted to the mechanism postulated therefor.

It has further been found, in accordance with a particularly preferred feature of the present invention, that the process hereof may be utilized to produce a novel class of chlorinated natural and synthetic rubbers having chlorine contents of the order of from about 1 to 75%, which chlorinated rubbers form transparent films which are harder than films formed from the corresponding non-chlorinated rubbers. Such films, which may be deposited from solutions of the chlorinated rubbers in benzene, toluene, methylene chloride, chloroform, carbon tetrachloride, or ethylene dichloride, are transparent, non-brittle and non-flame supporting. The chlorinated rubbers may thus be utilized, for example, as bases for paint and adhesive formulations.

The novel class of chlorinated rubbers thus provided contain the repeating group:

$$\left[ \cdots CH_2\underset{Z}{\overset{Cl}{C}}-\underset{}{\overset{CXCl_2}{C}HCH_2}-CH_2\underset{Z}{\overset{Cl}{C}}-\underset{}{\overset{CXCl_2}{C}HCH_2} \cdots \right]$$

in which Z may be hydrogen, methyl or chloro and X may be hydrogen or chloro. It will be understood that, at intervals along the polymer chain, the $-Cl$ and $-CXCl_2$ substituents may be interchanged, two $-Cl$ substituents or two $-CCl_3$ substituents being positioned adjacent one another. The particular orientation of such radicals will, of course, depend on the nature of the rubber to be chlorinated. These chlorinated rubbers are produced by addition of carbon tetrachloride or chloroform, employing the process hereof to unsaturation-containing elastomers containing the group $$\left[ \cdots CH_2C=CHCH_2-CH_2C=CHCH_2 \cdots \atop Z \qquad\qquad Z \right]$$

in which Z is as defined above.

The olefinically unsaturated substances reacted in accordance with the process of the present invention may be selected from a wide group of applicable classes of materials. Olefinic substances which are so useful include:

(a) The olefinically unsaturated hydrocarbons, e.g., ethylene, propylene, butene-1, butene-2, cyclobutene, isobutene, pentene-1, cyclopentene, cyclopentadiene, dicyclopentadiene, hexene-1, cyclohexene, heptene-1, octene-1, octene-2, limonene, nonene, decene, undecene, dodecene, allene (propadiene), 1,3-butadiene and mixtures thereof, and unsaturation-containing polymers of butadiene, 2-methyl-1,3-butadiene, 2,3-dimethyl-1,3-butadiene, natural rubber, piperylene, styrene, allyl benzene, diallyl benzene, 4-vinyl-cyclohexene, 1,5-hexadiene, 2,5-dimethyl-1,5-hexadiene; norbornadiene; and copolymers thereof.

(b) Halogenated olefinically unsaturated hydrocarbons, e.g., vinyl fluoride, vinyl chloride, vinylidene fluoride, vinylidene chloride, trifluoroethylene, trichloroethylene, tetrafluoroethylene, allyl chloride, methallyl chloride, crotyl chloride, 2,3-dichloropropene, 2-chloromethallyl chloride, 3,3,3-trichloropropene, 1,1,3-trichloropropene, 4 4,4 - trichloro-2-methylbutene-1, 2-chloro-1,3-butadiene, hexachlorocyclopentadiene and chlorendic anhydride or acid;

(c) Olefinically unsaturated alcohols; e.g., allyl alcohol, methallyl alcohol, 2-chlorallyl alcohol, 2-hydroxy-methallyl alcohols, ethallyl alcohol, crotyl alcohol, 3-butenol, 4-pentenol, 10-undecylenyl alcohol, and geraniol;

(d) Ethers of the olefinically unsaturated alcohols, e.g., vinyl methyl ether, vinyl ethyl ether, divinyl ether, methyl isopropenyl ether, vinyl n-butyl ether, vinyl phenyl ether, allyl ethyl ether, allyl octyl ether, allyl p-chlorophenyl ether, allyl p-methoxyphenyl ether, methallyl phenyl ether, 2-chlorallyl ethyl ether, diallyl ether, dimethallyl ether, 2-allyloxyethanol, methyl undecylenyl ether, methyl geranyl ether, vinylchloroethyl ether, and the analogous thioethers;

(e) Esters of the olefinically unsaturated alcohols and mono- and poly-basic, saturated and ethylenically unsaturated acids, e.g., vinyl acetate, vinyl n-butyrate, vinyl benzoate, isopropenyl acetate, allyl acetate, allyl propionate, triallyl borate, triallyl phosphate, allyl diethyl phosphate, diallyl oxalate, diallyl phthalate, allyl undecylenate, allyl ethyl sulfate, allyl dodecy sulfide, and methallyl acetate;

(f) Olefinically unsaturated acids and hydrolyzable derivatives thereof including nitriles, esters, chlorides, anhydrides and amides, such as methyl acrylate, ethyl acrylate, acrylonitrile, acrylic acid, methacrylic acid, crotonic acid, acrylyl chloride, acrylamide, methacrylamide, crotonic acid amide, oleic acid amide, diethyl fumarate, maleic anhydride, and diethyl 2-isobutenylphosphonate, and including those olefinic acids and their hydrolyzable derivatives which are devoid of alpha-ethylenic linkages, e.g., 2-butenonitrile, 4-pentenoic acid, oleic acid, linoleic acid, methyl undecylenate and beta-hydromuconic acid;

(g) Olefinically unsaturated aldehydes, e.g., acrolein, methacrolein, and crotonaldehyde, and olefinic ketones, e.g., vinyl methyl ketone, methyl isopropenyl ketone, butyl vinyl ketone, phenyl vinyl ketone and allyl methyl ketone.

Preferably, the olefinically unsaturated materials reacted in accordance herewith are selected from one of the following classes of compounds:

(1) The class of mono-olefinically unsaturated compounds having the formula:

$$\begin{array}{c} R_1 \\ \diagdown \\ R_2 \end{array} C=C \begin{array}{c} R_3 \\ \diagup \\ R_4 \end{array}$$

in which $R_1$, $R_2$, $R_3$ and $R_4$ may each be hydrogen, alkyl having from 1 to 20 carbon atoms, phenyl, aralkyl having from 1 to 20 carbon atoms in the aliphatic chain, naphthyl, nitrilo, fluoro, chloro, bromo, acyloxy having from 1 to 20 carbon atoms, alkoxyl having from 1 to 20 carbon atoms, carboxyl, carbalkoxyl having from 2 to 20 carbon atoms, or carbamido or N-substituted carbamido which may have from 1 to 20 carbon atoms in the alkylene chains providing N-substitution, which chains may be the same or different, or in which $R_1$ and $R_2$, or $R_3$ and $R_4$, may together form parts of alicyclic rings;

(2) Substantially stable, conjugated or unconjugated di-olefinically unsaturated materials having the formula:

$$\begin{array}{c} R_5 \\ \diagdown \\ R_6 \end{array} C=\underset{R_7}{\overset{}{C}}-(C)_x-\underset{R_8}{\overset{}{C}}=C \begin{array}{c} R_9 \\ \diagup \\ R_{10} \end{array}$$

wherein $R_5$, $R_6$, $R_7$, $R_8$, $R_9$ or $R_{10}$ may be hydrogen, halogen or alkyl having from 1 to 20 carbon atoms, and may be the same or different, and in which $x$ is an integer of from 0 to 20;

(3) Mono-olefinically unsaturated, substituted and unsubstituted cycloaliphatic compounds having the formula:

in which $x$ is an integer of from 2 to 20; and (4) Conjugated or unconjugated, di-olefinically unsaturated cycloaliphatic compounds having the formula

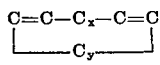

in which $x$ is an integer of from 0 to 20 and $y$ is an integer of from 1 to 20.

The copper or iron compound catalyst utilized in accordance with the process of the invention may comprise any suitable salt or other compound of copper or iron which can be dissolved in the reaction medium, and which is capable of fulfilling its function in the oxidation-reduction adduction of this invention. Suitably, such agent may be provided by use of the chlorides of copper or iron, in either valency state, and in either hydrated or anhydrous form. Suitable results have been achieved with, for example, cupric chloride dihydrate ($CuCl_2 \cdot 2H_2O$), anhydrous cupric chloride ($CuCl_2$), anhydrous cuprous chloride, ($CuCl$), ferrous chloride tetrahydrate ($FeCl_2 \cdot 4H_2O$), ferric chloride hexahydrate ($FeCl_3 \cdot 6H_2O$) or anhydrous ferric chloride ($FeCl_3$). It is also possible to utilize other copper or iron compounds which are soluble in the reaction medium as sources of iron or copper including, for example, iron naphthenate, cupric stearate, ferric acetylacetonate, and cupric acetylacetonate.

As indicated above, the carbon tetrachloride of chloroform reactant is conveniently utilized in the proportion of from about 0.05 to 20 moles per mole of the olefinically unsaturated reactant. In such instance, the iron or copper compound catalyst is incorporated in the reaction medium in an amount of from about 0.0005 to 0.1 mole per mole of the olefinically unsaturated material. Preferably, however, the carbon tetrachloride or chloroform reactant is incorporated in an amount of from about 0.25 to 4 moles per mole of the olefinically unsaturated reactant; in such case, the metal compound catalyst is incorporated in the reaction medium in an amount of from about 0.005 to 0.05 mole per mole of the olefinically unsaturated material.

The reactants may be dissolved together with the copper or iron compound in a variety of suitable solvents, the sole criterion for the solvent being that it be inert with respect to the several reactants and effect dissolution thereof. Moreover, the solvent need not be particularly dry, traces of water being acceptable except in the instance of additions to those olefinically unsaturated materials which are sensitive to water.

A wide variety of both polar and non-polar solvents may thus be utilized to provide the homogeneous reaction medium required in accordance with the invention. Thus, satisfactory results have been obtained employing methanol, i-propanol, tert.-butanol, acetonitrile, methylene chloride, carbon tetrachloride or chloroform (both of which may thus serve as solvents as well as reactants), benzene, and toluene.

Dissolution of the iron or copper metal compound in the reaction medium is believed due to the formation of chlorine ligand-containing complexes. Some solvents, e.g., acetonitrile, methanol, and i-propanol, may thus directly dissolve the metal compound catalyst. However, when other solvents are utilized as reaction media, it is often desirable to incorporate a solubilizing agent therewith which enhances the solubility of the iron or copper-containing material in the medium. Preferably an alkylammonium chloride solubilizer is so utilized; such material complexes the copper or iron cations, forming loosely bound chloride ions, viz, chlorine ligands, therewith.

Surprisingly, it has been found that, in addition to complexing and solubilizing the metal compound catalyst in the reaction medium, a substituted ammonium halide compound, such as an alkylammonium chloride, serves to prevent undesirable side reactions, such as the elimination of hydrochloric acid from the adduct products, and promotes or assists the addition reaction.

The alkylammonium chloride solubilizers utililzed in accordance herewith have the formula:

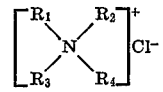

where $R_1$, $R_2$, $R_3$ and $R_4$ may be hydrogen or alkyl groups of from 1 to 20 carbon atoms, and may be the same or different, at least one of $R_1$, $R_2$, $R_3$ and $R_4$ being alkyl when the other substituents are hydrogen; or in which $R_1$, $R_2$, $R_3$ and $R_4$ may form parts of a ring system. Suitable alkylammonium chlorides include methyl-, ethyl-, hydroxyethyl-, octyl-, lauryl-, octadecyl-, dimethyl-, diethyl-, dilauryl-, trimethyl-, triethyl-, trioctyl-, and dilauryldimethylammonium chloride.

When employed, the alkylammonium chloride solubilizers are utilized in amounts varying from about 0.1 to 10 moles per mole of the iron or copper metal catalyst dispersed therein. Generally, adequate complexing and dispersion of the catalyst is achieved when from about 0.5 to 5 mols of the solubilizer per mole of the catalyst are employed.

As indicated, the copper or iron compounds must be at least partially in their lower valence states. Since the redox-transfer mechanism of the addition reaction involves the oxidation of the lower valence state of these metal species, it is highly desirable to provide some means for continually reducing the higher valent species, either formed by the addition reaction or added to the reaction medium, to maintain the desired portion of the metal compound catalyst in its lower valence state. This is certainly the case when the catalyst is, for example, introduced into the homogeneous reaction medium in the form of a cupric or ferric compound, and highly preferred when these same species are introduced as cuprous and ferrous compounds.

It has been found that various of the olefinically unsaturated substances and/or the solvents therefor act as reducing agents and thus maintain at least a portion of the copper or iron compounds in a reduced valence state. Hence, ethylene or butene-2, for example, effect reduction of cupric chloride in acetonitrile or methanol solvents.

Others of the olefinic materials, e.g., vinylidene chloride, do not easily effect such reduction, and, when it is desired to form adducts of such non-reducing or inadequately reducing materials, a further reducing agent is preferably added to the reaction mixture.

Any reducing agent which is soluble in the inert reaction medium and which possesses an electrode potential high enough to reduce ferric species to ferrous species, or cupric species to cuprous species (whichever form of catalyst is employed), may be utilized in accordance with the present invention. Applicable reducing agents which may be thus utilized widely differ from one another and, for example, include benzoin, hydroquinone, pyrogallol, benzaldehyde, acetone, 2,6-di-t-butyl-4-methylphenol, 1-naphthol, 2-naphthol, naphthylamine, 2-naphthylamine, stannous chloride, soluble sulfites, e.g., sodium sulfite, dihydroanthracene, etc. The reducing agents thus added may conveniently be utilized in amounts of from about 0.1 to 10 moles per mole of the copper or iron compound catalyst present in the homogeneous reaction medium.

The solution of the carbon tetrachloride or chloroform reactant, the olefinically unsaturated substance, the copper or iron compound catalyst and, if desired, an alkylammonium chloride solubilizer and/or a reducing agent, in a suitable inert solvent is desirably reacted at temperatures ranging from room temperature (about 20° C.) to about 300° C. Preferably, the reaction is carried out at temperatures within the range of from about 50° to 200° C., optimum results having been obtained at temperatures of from 70° to 150° C. The reaction may be carried out at any suitable pressures, pressures of from about 1 to 300 atmospheres being acceptable.

After maintaining the reaction for a period of from about 10 minutes to 48 hours, preferably from about 1 to 24 hours, the reaction product is separated from any residual unreacted olefinic material and from the solvent by distillation, and purified. The selective product comprises a predominant proportion, generally more than about 70% and, in many instances, as much as 95% or higher, of the desired 1:1 adduct, which may be separated and further purified by distillation and other conventional operations.

The processes and products of the present invention are more fully illustrated in the following examples of preferred embodiments thereof.

EXAMPLE 1.—ADDUCT OF CCl₄ AND ETHYLENE 162 mg. (1 mmole) anhydrous ferric chloride and 212 mg. (1 mmole) benzoin were dissolved in a mixture of 2 g. isopropanol and 15.4 g. (0.1 mole) carbon tetrachloride. The resulting solution was charged into a silver-lined autoclave of 100 ml. contents, and kept under an ethylene-pressure of 800 p.s.i. for 1.5 minutes, with stirring. The ethylene pressure was then lowered to 600 p.s.i. 14 g. ethylene was thus introduced into the reaction mixture.

The closed autoclave was heated to 100° C., and maintained at such temperature for 12 hours, while slowly stirring. The pressure rose to 1100 p.s.i. After cooling, the excess ethylene was slowly released, and the contents of the autoclave washed twice with 1 N aqueous hydrochloric acid.

After drying on calcium chloride, 8.3 grams of a product having a boiling range of 60–130° C. at 25 mm. pressure was produced by distillation, employing heating bath temperatures up to 170° C. The product contained, according to vapor phase chromatography, 80% 1,1,1,3-tetrachloropropane, a 1:1 adduct, and 20% 1,1,1,5-tetrachloropentane, a 2:1 adduct. The selectivity, as defined above (the percentage of 1:1 adduct in the reaction product) was thus 80%.

When the preceding reaction was carried out in the presence of 206 mg. (1.5 mmole) triethylammonium chloride, 11 g. distillate were obtained having a boiling range of 60°–130° C. at 25 mm. pressure, and containing 85% tetrachloropropane and 15% tetrachloropentane. The selectivity, therefore, was 85%.

When the preceding reaction was repeated in the presence of 238 mg. (1 mmole) of cobaltous chloride hexahydrate, in place of the ferric chloride material compound catalyst, no reaction took place, either in the presence or absence of quantities of triethylammonium chloride.

When the preceding reaction was carried out in the presence of an equivalent amount of chromic chloride decahydrate, in place of the ferric chloride catalyst, no reaction took place; such was true, whether or not triethylammonium chloride was also incorporated in the reaction mixture.

EXAMPLE 2.—ADDUCT OF CCl₄ AND ETHYLENE 15.4 g. (0.1 mole) carbon tetrachloride, 2 g. isopropanol, 356 mg. (1 mmole) ferric acetylacetonate and 212 mg. (1 mmole) benzoin were introduced into a 200 ml. silver-lined autoclave fitted with a magnetic follower. The autoclave was closed and maintained under an ethylene-pressure of 800 p.s.i. at room temperature, with stirring. The pressure was then released to 600 p.s.i. In this manner, 14 g. (0.5 mole) of ethylene were introduced into the reaction mixture. The autoclave was then heated at 100° C. for 12 hours with stirring, the pressure reaching 1200 p.s.i. After cooling the autoclave to room temperature, the excess ethylene pressure was released and the contents of the autoclave washed with 6 N aqueous hydrochloric acid and water, and dried on calcium chloride.

The solvent was distilled off at atmospheric pressure and the residual product distilled in vacuo (the bath distilled reaching a final temperature of 190° C.) 11 g. of distillate were thus collected, having a boiling point of 60°–140° C. at 25 mm. The product consisted of 75% 1,1,1,3-tetrachloropropane and 25% 1,1,1,5-tetrachloropentane. The selectivity was 75%.

When the reaction was conducted in the absence of benzoin only 1.5 g. of total distillate were produced.

EXAMPLE 3.—ADDUCT OF CCl₄ AND PROPYLENE 35 g. (0.05 mole) iron naphthenate, 6.0 g. (0.05 mole) triethylammonium chloride and 10.6 g. (0.05 mole) benzoin were dissolved in 120 g. methylene chloride. 770 g. (5 moles) carbon tetrachloride was added, and the resulting solution charged into a glass-lined autoclave. 84 g. (2 mole) propylene was added, and the mixture heated at 80° C. for 7 hours. After cooling, unconverted propylene was slowly released, the reaction-mixture washed with 1 N aqueous hydrochloric acid, and freed from solvent and excess carbon tetrachloride.

Distillation in vacuo produced 230 g. of pure 1,1,1,3-tetrachlorobutane, boiling point 70–75° C. at 25 mm. pressure. Yield: 50%, calculated on charged propylene. 4 g. residue remained. The selectivity was thus 94%.

When the reaction was carried out without triethylammonium chloride, the product yield was reduced to 38%, with the selectivity unchanged.

EXAMPLE 4.—ADDUCT OF CARBON TETRACHLORIDE AND BUTENE-1

8.4 g. (0.15 mole) butene-1 was dissolved in 46 g. (0.3 mole) carbon tetrachloride. A solution of 298 mg. (1.5 mmole) ferrous chloride tetrahydrate in 15 g. methanol was added, and the resulting mixture, after sealing in a glass-tube, heated at 82° C. for ten hours. After cooling, the contents of the tube were washed with 1 N aqueous hydrochloric acid, dried on calcium chloride, and freed from excess carbon tetrachloride at atmospheric pressure, by heating up to 100° C.

Distillation in vacuo produced 25 g. 1,1,1,3-tetrachloropentane of B.P. 85–110° C. at 20 mm. pressure (yield, 80%); the product was found, by vapor-phase chromatography, to be substantially pure. The selectivity was 95%.

When the reaction was carried out in the presence of equivalent amounts of ferric chloride hexahydrate and benzoin instead of ferrous chloride, a yield of 96% of the tetrachloropentane product was produced, after heating the reactants at 82° C. for 6 hours. The addition of the reducing agent markedly increased the conversion, the selectivity remaining 95% in both cases.

EXAMPLE 5.—ADDUCT OF CCl₄ AND ISOBUTENE 8.4 g. (0.15 mole) isobutene was dissolved in 46 g. (0.3 mole) carbon tetrachloride. A solution of 405 mg. (1.5 mmole) ferric chloride hexahydrate and 159 mg. (0.75 mmole) benzoin in 10 g. isopropanol was added. The resulting mixture was then sealed in a glass tube, and heated at 82° C. for 2 hours.

When the product was treated in the manner described in Example 4, 24.5 g. of pure 1,1,1,3-tetrachloro-3-methylbutane, B.P. 80–95° C. at 20 mm. pressure, was produced. (Yield: 78%; selectivity: 90%).

EXAMPLE 6.—ADDUCT OF CCl₄ AND OCTENE-1

16.8 g. octene-1, 46 g. carbon tetrachloride, 1 g. diethylammonium chloride, 0.25 g. CuCl₂·2H₂O and 20 g. isopropanol were heated at 100° C. for 12.5 hours, in a closed ampoule. After cooling and opening of the ampoule, the contents were washed once with water, and freed by distillation from solvent, excess carbon tetrachloride and unconverted octene-1. Two product fractions were collected: 2.6 g. boiling at 25 mm. Hg: 40–80° C., consisting mainly of unconverted octene-1 and 16.6 g. boiling at 0.3 mm. Hg; 87–95° C. (bath-temperature up to 200° C.). A residue of 1.0 g. remained. The main fraction consisted of pure 1,1,1,3-tetrachlorononane. Chlorine content: 53%. Theoretical analysis for $C_9H_{16}Cl_4$: 53.3%. $n_D^{25}=1.4746$. The conversion, based on octene-1, was 42%, and the selectivity was 95%.

EXAMPLE 7.—ADDUCT OF CHCl₃ AND OCTENE-1

A mixture comprising 11.2 g. octene-1, 36 g. chloroform, 0.5 g. FeCl₃·6H₂O, 0.5 g. dimethylammonium chloride and 15 g. methanol, was heated in a closed ampoule at 142° C. for 22 hours. After cooling down, the ampoule was opened and the contents washed with 1 N hydrochloric acid and with water. Excess chloroform was distilled off by heating on an oil bath to 160° C. Towards the end of the distillation unconverted octene came over and the distilling off of octene was continued at 25 mm. Hg. The product was distilled off at 0.3 mm. Hg. 18.6 g. pure 1,1,3-trichlorononane, B.P. at 0.3 mm. Hg: 71–81° C., were thus obtained. A residue of 1.9 g. remained. (yield: 80%; selectivity: 92%).

EXAMPLE 8.—ADDUCT OF CCl₄ AND VINYL CHLORIDE 9.4 g. (0.15 mole) vinyl chloride was dissolved in 46 g. (0.3 mole) carbon tetrachloride. A solution of 402 mg. (3 mmole) anhydrous cupric chloride and 618 mg. (4.5 mmole) triethylammonium chloride in 10 g. acetonitrile was added. The resulting mixture was sealed in a glass tube, and heated at 110° C. for 48 hours. After cooling and opening of the tube, its contents were washed with water and dried on calcium chloride.

After evaporation of excess carbon tetrachloride, distillation in vacuo produced 31.8 g. practically pure 1,1,1,3,3-pentachloropropane, B.P. 90–95° C. at 20 mm. pressure. $n_D^{20}$: 1.4981. (Yield: 98%; selectivity: 98%.)

When the preceding reaction was carried out in the absence of triethylammonium chloride, the conversion to pentachloropropane was reduced to 35% with the selectivity 75%.

EXAMPLE 9.—ADDUCT OF CCl₄ AND VINYLIDENE CHLORIDE 9.7 g. (0.1 mole) vinylidene chloride was dissolved in 31 g. (0.2 mole) carbon tetrachloride. A solution of 212 mg. (1 mmole) benzoin, 402 mg. (3 mmole) anhydrous cupric chloride and 618 mg. (4.5 mmole) triethylammonium chloride in 7 g. acetonitile was then added. The resulting mixture was sealed in a glass tube after displacement of air by carbon dioxide, and heated at 100° C. for 6 hours. After cooling, filtering, washing of the filtrate with 1 N aqueous hydrochloric acid, and drying on calcium chloride, excess carbon tetrachloride was evaporated on a boiling water-bath.

Distillation of the residue produced 9.3 g. 1,1,1,3,3,3-hexachloropropane, B.P. 114–124° C. at 20 mm. pressure. (Yield: 37%) 3.5 g. distillation-residue remained. Rectification produced a pure product, B.P. 114–115° C. at 20 mm. pressure. $n_D^{20}$: 1.5180. Selectivity: 70%.

EXAMPLE 10.—ADDUCT OF CCl₄ AND VINYL ACETATE 12 g. (0.15 mole) vinyl acetate, 46 g. (0.3 mole) carbon tetrachloride, 0.25 g. cupric chloride dihydrate and 0.25 g. diethylammonium chloride were dissolved in 30 g. chloroform, and heated at 100° C. for 12 hours. After cooling, the reaction-mixture was decanted from tars, and freed from solvent by heating up to 150° C. The residue was distilled in vacuo. 16.3 g. distillate was obtained, B.P. 70–110° C. at 25 mm. pressure, consisting of 1,1,1,3-tetrachloro-3-acetoxypropane. Yield: 46.5%. The predominant proportion of the product comprised the 1:1 adduct.

EXAMPLE 11.—ADDUCT OF CCl₄ AND ACRYLIC ACID 0.25 g. cupric chloride dihydrate and 0.25 g. diethylammonium chloride dissolved in 10.8 g. glacial acrylic acid were admixed with 46 g. carbon tetrachloride containing 0.16 g. benzoin. The mixture was sealed in a Carius tube and heated at 110° C. for 8 hours. After cooling, the reaction mixture was washed with 0.1 N hydrochloric acid and the excess of carbon tetrachloride distilled off at ambient pressure. Distillation was continued at reduced pressure.

There was thus obtained 3.0 g. unconverted acrylic acid, B.P. 40–65° C. at 25 mm. Hg, and 7.2 g. $\alpha,\gamma,\gamma,\gamma$-tetrachlorobutyric acid, B.P. 100–116° C. at 0.06 mm. Hg, $n_D^{25}=1.5009$, i.e., a yield of 21% calculated on acrylic acid. Equivalent weight found: 230, calculated: 226. Selectivity: 60%.

When the reaction described above was repeated, employing 5 g. acetonitrile as a co-solvent, the product yield was increased to 44%, with a selectivity of 80%.

When the reaction was again repeated, in the absence of benzoin, the yield of tetrachlorobutyric acid was 10%, and when repeated in the absence of diethylammonium chloride, the yield was 16%. The selectivity, in each instance, was in excess of 50%.

EXAMPLE 12.—ADDUCT OF CCl₄ AND ACRYLAMIDE

To a solution of 10.7 g. acrylamide and 0.32 g. benzoin in 46.0 g. carbon tetrachloride there was added a solution of 0.256 g. cupric chloride dihydrate and 0.33 g. diethylammonium chloride in 15 g. acetonitrile. The resulting mixture was heated in a sealed ampoule at 110° C. for 16 hours. After cooling, the ampoule was opened and its contents subjected to steam distillation for one hour. The residue, consisting of crude $\alpha,\gamma,\gamma,\gamma$-tetrachlorobutyramide, solidified. M.P. 84–87° C., yield: 71% calculated on acrylamide. After recrystallization from water, the melting point and mixed melting point with an authentic sample were 86–87° C. Substantially no 2:1 adduct was formed.

When the preceding reaction was repeated, employing crotonic acid as a reactant, the compound $\alpha,\gamma,\gamma,\gamma$-tetrachloro-$\beta$-methylcrotonic acid was prepared; when oleic acid was reacted, trichloromethyl-chloro-stearic acid was prepared; and when oleic acid amide was so reacted, trichloromethyl-chloro-stearic acid amide was produced. In each case, no substantial amounts of other than the 1:1 adducts were present.

EXAMPLE 13.—ADDUCT OF CCl₄ AND STYRENE 0.17 g. CuCl₂·2H₂O and 0.6 g. diethylammonium chloride were dissolved in 15 g. acetonitrile. 10.4 g. styrene and 31 g. carbon tetrachloride were added and the resulting solution heated at 100° C. for 15 hours. Thereafter, the reaction mixture was washed once with water and freed from solvent and excess carbon tetrachloride by distillation, at atmospheric pressure (bath-temperature up to 160° C.).

Distillation in vacuo produced 21.7 g. 1,1,1,3-tetrachloro 3-phenyl propane, B.P. at 0.5 mm. Hg; 90–110° C. (bath-temperature up to 190° C.).

When the preceding reaction was repeated in the presence of 238 mg. (1 mmole) nickelous chloride hexahydrate in place of the cupric chloride dihydrate catalyst, no 1,1,1,3-tetrachloro-3-phenyl propane was obtained.

When the preceding reaction was carried out in the presence of equivalent amounts of manganous chloride tetrahydrate in place of the cupric chloride dihydrate catalyst, no 1:1 adduct was formed.

EXAMPLE 14.—ADDUCT OF CCl₄ AND BUTADIENE 8.1 g. butadiene (0.15 mole), 46 g. carbon tetrachloride (0.3 mole), 0.25 g. CuCl₂·2H₂O, 1 g. diethylammonium chloride and 15 g. acetonitrile were heated at 105° C. for 17 hours in a sealed Carius tube; after cooling and opening of the tube, its contents were washed once with 0.1 N hydrochloric acid and freed from solvent and excess carbon tetrachloride by distillation at atmospheric pressure (bath-temperature up to 140° C.). Distillation in vacuo produced 29.0 g. pure 1,1,1,5-tetrachloro-pentene-3 (yield 93%), 1.5 g. residue remaining. Selectivity: 95%.

When the preceding reaction was repeated, employing 0.15 g. cuprous chloride instead of 0.25 g. $CuCl_2 \cdot 2H_2O$, the same product and selectivity was obtained.

When the reaction was repeated in the absence of diethylammonium chloride, 21.7 g. pure 1,1,1,5-tetrachloropentene-3 were obtained. Selectivity: 78%.

EXAMPLE 15.—ADDUCT OF $CCl_4$ AND BUTADIENE 8.1 g. (0.15 mole) butadiene, 46 g. (0.3 mole) carbon tetrachloride, 0.95 g. cupric stearate and 10 g. acetonitrile were heated together in a sealed glass-tube at 105° C. for 16 hours. After cooling, the reaction-mixture was washed with water, and freed from solvent and excess carbon tetrachloride. Distillation in vacuo produced 16.7 g. pure 1,1,1,5-tetrachloropentene-3, of B.P. 105–115° C. at 25 mm. pressure. A residue of 11.1 g. remained. Selectivity: 60%.

EXAMPLE 16.—ADDUCT OF $CCl_4$ AND BUTADIENE 262 mg. (1 mmole) cupric acetylacetonate was introduced into a Carius tube. A solution of 5.4 g. (0.1 mole) butadiene in a mixture of 31 g. (0.2 mole) carbon tetrachloride and 5 g. acetonitrile was added, the tube cooled in liquid air, evacuated to 0.1 mm. pressure, sealed, and heated at 100° C. for 22 hours. After cooling, the contents of the tube were washed with 1 N aqueous hydrochloric acid and with a solution of disodium dihydrogen versenate, and dried on calcium chloride.

The solvent was distilled off at atmospheric pressure, and the remainder distilled in vacuo. 6.5 g. product, of B.P. 76–150° C. at 25 mm. consisting of 1,1,1,5-tetrachloropentene-3, and 2.6 g. of further product, boiling at 85–160° C. at 0.15 mm. and consisting mainly of a mixture of isomeric tetrachlorononadienes, were thus obtained. 1.6 g. residue remained. Selectivity: 63%.

EXAMPLE 17.—ADDUCT OF $CCl_4$ AND BUTADIENE-ACRYLIC ACID COPOLYMER 1.2 g. of a butadiene-acrylic acid copolymer (M.W. about 7000, bulk viscosity 33,500 cps. at 14° C., 0.18 eqvs. carboxyl per 100 g. polymer) was dissolved in a mixture of 65 mg. (0.4 mmole) anhydrous ferric chloride, 42 mg. (0.2 mmole) benzoin, 0.3 g. isopropanol and 12 g. carbon tetrachloride. The solution was sealed in a glass tube, and heated at 100° C. for 5 hours. After cooling, the reaction-mixture was washed three times with 1 N hydrochloric acid, and dried on calcium chloride. The solvent was thereafter evaporated, finally at 0.1 mm. pressure, for 2 days. The very tacky residue (2.5 g.) had a chlorine content of 22%.

EXAMPLE 18.—ADDUCT OF $CCl_4$ AND POLYBUTADIENE 0.54 g. of a commercial polybutadiene elastomer (Firestone FR–S 2004 Latex, Firestone Tire and Rubber Co., Akron, Ohio) was heated with a solution of 54 mg. (0.2 mmole) ferric chloride hexahydrate, 85 mg. (0.2 mmole) commercial dilauryl-dimethylammonium chloride, and 42.4 mg. (0.2 mmole) benzoin in 9 g. carbon tetrachloride, for 16 hours at 100° C. Treatment of the reaction-product with 200 ml. methanol, and thorough drying produced 1.3 g. of chlorinated polybutadiene, having a chlorine content of 48.9%.

EXAMPLE 19.—ADDUCT OF $CCl_4$ AND CIS-POLYBUTADIENE 1.1 g. of an all-cis polybutadiene (Polysar Taktene 1200) was dissolved in a solution of 85 mg. (0.4 mmole) benzoin and 65 mg. (0.4 mmole) anhydrous ferric chloride in 21 g. carbon tetrachloride containing 0.3 g. isopropanol. The resulting solution was heated at 100° C. for 25 minutes, cooled and treated in the manner described in Example 15.

2.2 g. white material was thus obtained, resembling in appearance and solubility the adducts of carbon tetrachloride and natural rubber, described below. The chlorine content of the product was 49.4%. The solutions of this chlorinated polybutadiene were considerably more viscous than those of natural rubber-adducts of the same concentration. On evaporation of the material, transparent, non-brittle and non-flame supporting films were produced therefrom.

EXAMPLE 20.—ADDUCT OF $CCl_4$ AND NATURAL LATEX RUBBER 136 g. of a solution, containing 5% natural latex rubber in carbon tetrachloride, was mixed with a solution of 0.65 g. diethylammonium chloride and 0.17 g. $CuCl_2 \cdot 2H_2O$ in 10 g. acetonitrile and 85 g. chloroform. The resulting viscous homogeneous solution was heated in a closed glass vessel at 100° C. for 24 hours. After cooling and opening of the vessel, its contents were added dropwise, for 1 hour, to 2500 cc. vigorously stirred methanol. The precipitate formed was filtered off, washed thoroughly with methanol, and dried in vacuo over calcium chloride for 48 hours. The material was then ground to a powder and dried in vacuo, over calcium chloride, for an additional 24 hours.

14.3 g. of a grayish-brown powder were thus obtained readily soluble in carbon tetrachloride, chloroform, benzene or petroleum ether. Solutions of the powder were film-forming and the dried film self-extinguishing. Chlorine content of the dry rubber derivative: 49.54%.

The preceding reaction was also carried out, employing as a reactant a natural latex having a 30% rubber content.

EXAMPLE 21.—ADDUCT OF $CCl_4$ AND NATURAL RUBBER 0.68 g. of natural rubber was dissolved in a solution of 9.7 g. carbon tetrachloride, 0.2 g. isopropanol, 32.4 mg. (0.2 mmole) anhydrous ferric chloride and 42.4 mg. (0.2 mmole) benzoin, giving a solution containing 7% rubber. This solution was sealed in a test tube and heated at 100° C. for 4 hours. The tube was cooled, opened, and its contents slowly dropped into 250 ml. stirred methanol. The resulting precipitate was sucked off, washed with methanol, and dried in a vacuum for 2 days. 1.3 g. of a chlorinated rubber were thus obtained, having a chlorine content of 43.5%. When the example was repeated, doubling the amount of benzoin, the chlorine content of the product formed increased to 47%.

A solution of this material in methylene chloride left a transparent non-brittle film, after evaporation of the solvent, which film was not flame-supporting. The same result was obtained when the addition of carbon tetrachloride to the rubber was carried out in a mixture of the former compound and methylene chloride.

After-chlorination of the above chlorinated rubber, dissolved in carbon tetrachloride, for four hours at 40° C. and subsequent precipitation with methanol, as above, produced a chlorinated rubber with a chlorine content of 54%, the solutions of which formed transparent films, which were considerably harder than those of the material before chlorination.

EXAMPLE 22.—ADDUCT OF $CCl_4$ AND NATURAL RUBBER 0.68 g. natural rubber was dissolved in a solution containing 0.2 mmole anhydrous cupric chloride (hydrated cupric chloride or cuprous chloride could similarly be employed) and 42 mg. (0.3 mmole) triethylammonium chloride in a mixture of 12 g. methylene chloride and 6.2 g. carbon tetrachloride. The resultnig solution was sealed in a test tube, and heated at 100° C. for 10 hours. There was thus produced 1.4 g. chlorinated rubber, with a chlorine content of 46.5%.

When triethylammonium chloride was replaced by an equivalent amount of commercial octadecylammonium chloride and benzene was used as the co-solvent instead of methylene chloride, a material with a chlorine-content of 43.7% was obtained.

EXAMPLE 23.—ADDUCT OF $CCl_4$ AND NATURAL RUBBER 1.36 g. natural rubber was completely dissolved in a mixture of 65 mg. (0.4 mmole) anhydrous ferric chloride, 42.4 mg. (0.2 mmole) benzoin, 0.3 g. isopropanol and 12.2 g. carbon tetrachloride. The resulting solution, containing 10% rubber, was sealed in a glass tube, and heated at 100° C. for 1 hour. After cooling, the reaction-mixture was slowly introduced into 200 ml. stirred methanol.

The precipitate formed was sucked off, washed with methanol, left overnight in 100 ml. methanol, and finally dried in a high vacuum for 1 day. 2.8 g. of a chlorinated rubber was thus obtained as a white asbestos-like material, having a chlorine-content of 42%.

When the preceding reaction was repeated, in the absence of isopropanol, 2.3 g. of a chlorinated rubber having 31% chlorine content was obtained.

The chlorinated rubbers thereby produced were soluble in benzene, toluene, methylene chloride, chloroform, carbon tetrachloride and ethylene dichloride. The solutions of the rubbers in such materials leave, after complete evaporation of the solvents, transparent non-brittle and non-flame supporting films.

EXAMPLE 24.—ADDUCT OF $CCl_4$ AND NORBORNADIENE

To a solution of 4.6 g. (0.05 mole) norbornadiene in 31 g. (0.2 mole) carbon tetrachloride was added a solution of 2.7 g. (10 mmole) ferric chloride hexahydrate and 212 mg. (1 mmole) benzoin in 15 g. acetonitrile. The resulting mixture was sealed under carbon dioxide, and heated at 100° C. for one hour. After cooling, washing of the reaction mixture with water, drying on calcium chloride, and evaporation of excess carbon tetrachloride on a boiling water-bath, distillation in vacuo produced 11 g. slightly contaminated 3-trichloromethyl 5-chloro-nortricyclene, B.P. 72–130° C. at 0.1 mm. pressure. Rectification produced a pure product of B.P. 76–78° C. at 0.1 mm. pressure. $n_D^{20}$: 1.5420. The selectivity was greater than 80%.

EXAMPLE 25.—ADDUCT OF $CHCl_3$ AND STYRENE

To a mixture of 10.4 g. (0.1 mole) styrene and 36 g. (0.3 mole) chloroform was added a solution of 0.54 g. ferric chloride hexahydrate (2 mmole) and 160 mg. (0.75 mmole) benzoin in 10 g. acetonitrile. The mixture was sealed in an ampoule, and heated in a carbon dioxide atmosphere at 126° for 15 hours. After cooling and opening of the ampoule, its contents were washed once with water, and after drying over calcium chloride, freed from solvent and unconverted reactants by distillation at atmospheric pressure in a bath at up to 150° C., and at 25 mm. pressure in a bath at up to 120° C.

Continued distillation at 0.3 mm. pressure afforded a 9.4 g. fraction of B.P. 85–90°, consisting of nearly pure 1,1,3-trichloro-3-phenyl propane (42% yield, calculated on converted styrene). 6.8 g. residue remained. Selectivity: 58%.

The 1,1,3-trichloro-3-phenyl propane was characterized as its reaction-product with thiourea, the S-($2^1,2^1$-dichloroethylbenzyl) isothiuronium chloride, M.P. 211–213 under decomposition. (Total chlorine content, by combustion: 35.3% chloride-ion: 11.7%. Required for $C_{10}$, $H_{13}$, $Cl_3$, $N_2S$: total chlorine: 35.5%. Chloride-ion: 11.8%).

EXAMPLE 26.—ADDUCT OF $CCl_4$ AND CYCLOPENTENE

To a solution of 3.4 g. cyclopentene (0.05 mole) in 15.4 g. (0.1 mole) carbon tetrachloride was added a solution of 270 mg. (1 mmole) ferric chloride hexahydrate and 212 mg. (1 mmole) benzoin in 10 g. isopropanol. The resulting mixture was sealed under carbon dioxide, and heated at 100° C. for 5 hours. After cooling, washing of the reaction-mixture with water, drying on calcium chloride and evaporation of unconverted reactants on a boiling water bath distillation in vacuo afforded 1:1 adduct, 1-chloro-2-trichloromethylcyclopentane, in selectivity in excess of 50%.

EXAMPLE 27.—ADDUCT OF $CHCl_3$ AND CIS-POLYBUTADIENE 1.1 g. of an all-cis polybutadiene (Polysar Taktene, 1200) was dissolved in a solution of 170 mg. (0.8 mmole) benzoin and 130 mg. (0.8 mmole) anhydrous ferric chloride in 20 g. chloroform containing 0.5 g. isopropanol. The resulting solution was heated at 150° C. for 5 hours, cooled, and dropped slowly into 250 ml. cooled and stirred methanol.

A chlorine-containing polybutadiene adduct was obtained in good yield.

EXAMPLE 28.—ADDUCT OF $CCl_4$ AND CYCLOHEXADIENE

To a solution of 4.1 g. (0.05 mole) cyclohexadiene in 15.4 g. (0.1 mole) carbon tetrachloride was added a solution of 85 mg. (0.5 mmole) cupric chloride dihydrate and 125 mg. (0.75 mmole) octylammonium chloride in 10 g. acetonitrile. The mixture was sealed under carbon dioxide and heated at 100° for 3 hours.

After cooling, the reaction mixture was washed with water, dried on calcium chloride and freed from unconverted reactants by distillation at atmospheric pressure from a bath of up to 150° C. The adduct, 1-chloro-4-trichloromethylcyclohexene-2, was obtained in high selectivity.

EXAMPLE 29.—ADDUCT OF $CHCl_3$ AND BUTENE-1

5.6 g. (0.1 mole) butene-1 was dissolved in 36 g. (0.3 mole) chloroform. A solution of 540 mg. (2 mmole) ferric chloride hexahydrate and 413 mg. (3 mmole) triethylammonium chloride in 6 g. methanol was added, and the resulting mixture was sealed in an ampoule in an atmosphere of carbon dioxide and heated at 145° C. for 15 hours.

After cooling, the contents of the ampoule were washed once with water, dried on calcium chloride and freed from unconverted reactants by distillation at atmospheric pressure from a bath of up to 120° C. Distillation at 25 mm. pressure afforded 14.6 g. substantially pure 1,1,3-trichloropentane, B.P./25: 73–79° C. (Yield: 83%, calculated on butene-1). 1.8 g. residue remained. (selectivity: 89%).

Rectification produced pure 1,1,3-trichloropentane, B.P./25: 75° C., $n_D^{25}$:1.4641.

Cis-butene-2 produced, under the same reaction conditions, a conversion of 60% into a mixture of diastereoisomeric adducts, of B.P./25: 76° C., and $n_D^{25}$:1.4683.

EXAMPLE 30.—ADDUCT OF $CHCl_3$ AND OCTENE-1

540 mg. ferric chloride hexahydrate (2 mmole), 413 mg. (3 mmole) triethylammonium chloride and 420 mg. (2 mmole) benzoin were dissolved in 5 g. acetonitrile. 11.2 g. (0.1 mole) peroxide-free octene-1 and 36 g. (0.3 mole) chloroform were added. The resulting mixture was sealed in an ampoule in an atmosphere of carbon dioxide and heated at 110° C. for 24 hours. After washing with water, solvent and unconverted reactants were removed by distillation at atmospheric pressure, and subsequently at 25 mm., from a bath of up to 130°. The distillation was continued at 0.8 mm. pressure and afforded 11.3 g. substantially pure 1,1,3-trichlorononane, B.P./0.8: 90–99° C. 0.7 g. residue remained. (Yield: 49%, calculated on charged octene-1) (selectivity: 94%).

Rectification gave the pure adduct: B.P./0.5: 90° C., $n_D^{25}$: 1.4653.

When the above experiment was repeated in the absence of benzoin, the yield of adduct was only 5%, the balance being unchanged octene-1 and chloroform.

EXAMPLE 31.—ADDUCT OF CCl₄ AND ALLENE

A solution of 2 g. (0.05 mole) allene in 15.4 g. (0.1 mole) carbon tetrachloride was introduced into a precooled Carius tube. A solution of 170 mg. (1 mmole) cupric chloride dihydrate and 206 mg. (1.5 mmole) triethylammonium chloride in 5 g. acetonitrile was added thereto. The tube was cooled in liquid air, evacuated to 0.1 mm. pressure, sealed, and heated at 125° for 16 hours. After cooling, the contents of the tube were washed with 1 N aqueous hydrochloric acid and with a solution of disodium dihydrogen versenate, dried on calcium chloride, feed from solvent and distilled in vacuum.

1.5 g. of B.P. 103–134° C. at 25 mm. were collected, consisting, according to vapor phase chromatography, of the aduct of 1 mole of carbon tetrachloride to 1 mole of allene, and 8.0 g. of B.P. 90–134° C. at 0.15 mm., consisting mainly of the adduct of 2 moles of carbon tetrachloride to 1 mole allene (chlorine content: 80.1%); 0.3 g. residue remained.

EXAMPLES 32–48.—CCl₄ ADDUCTS

A number of additional reactions were carried out, forming adducts of various olefinically unsaturated materials with carbon tetrachloride. Other than as indicated in the footnotes to the following tables, each example involved the reaction of 0.1 mole of the unsaturated material with 0.2 mole carbon tetrachloride in the presence of 0.2 mole of the indicated solvent and 1 mmole of the designated catalyst. In each of the following examples, same for Examples 43, 44, 45, diethylammonium chloride was incorporated in the reaction medium. The diethylammonium chloride was incorporated in the amount of 1.5 mmoles per 0.1 mole of the olefinically unsaturated substance in Examples 32–42 and 46, and in the amount of 6 mmoles per 0.1 mole of the olefinically unsaturated substance in Examples 47 and 48. The reactants and adducts formed, together with the selectivity and product yield (based on the amount of unsaturated substance reacted) are indicated in Table I below, reaction conditions employed in the several examples are given in Table II, and the properties and analyses of the several adducts thus formed are given in Table III.

TABLE I.—REACTANTS AND 1:1 ADDUCTS FORMED

Examples 32–48

| Example | Unsaturated compound | Product | Percent Selectivity | Yield |
|---|---|---|---|---|
| 32 | Styrene | C₆H₅—CH(Cl)—CH₂—CCl₃ | >90 | 92 |
| 33 | Butadiene | Cl₃C—CH₂—CH=CH—CH₂—Cl | | 90 |
| 34 | Acrylonitrile | Cl₃C—CH₂—CH(Cl)—CN | >90 | 85 |
| 35 | Methylacrylate | Cl₃C—CH₂—CH(Cl)—CO₂CH₃ | >90 | 71 |
| 36 | do | Same as above | >90 | 30 |
| 37 | Allylalcohol | Cl₃C—CH₂—CH(Cl)—CH₂OH | >70 | 55 |
| 38 | Butene-1 | Cl₃C—CH₂—CH(Cl)—C₂H₅ | 90 | 14 |
| 39 | do | Same as above | 90 | 92 |
| 40 | do | do | 90 | 90 |
| 41 | do | do | 90 | 24 |
| 42 | do | do | 90 | 19 |
| 43 | Butene-2(cis) | CH₃—CH(Cl)—CH(CCl₃)—CH₃ | 95 | 67 |
| 44 | do | Same as above | 95 | 23 |
| 45 | do | do | 95 | 95 |
| 46 | Octene-1 | Cl₃C—CH₂—CH(Cl)—C₆H₁₃ | >95 | 96 |
| 47 | Ethylacrylate | CCl₃—CH₂—CHCl—CO₂Et | >60 | 46 |
| 48 | Octene-2 | CCl₃—CHMe—CHCl—C₅H₁₁ | >95 | 60 |

TABLE II.—REACTION CONDITIONS

Examples 32–48

| Example | Solvent | Catalyst | Reducing agent (mmoles) | Temp. (° C.) | Time (hrs.) |
|---|---|---|---|---|---|
| 32 | Acetonitrile | A | | 110 | 7 |
| 33 | do | A | | 100 | 6 |
| 34 | do | A | [1] 0.5 | 110 | 12 |
| 35 | do | A | [1] 1 | 109 | 15 |
| 36 | do | A | | 109 | 15 |
| 37 | i-Propanol | B | [1] 1 | 100 | 7 |
| 38 | do | B | | 100 | 16.5 |
| 39 | do | B | [1] 1 | 82 | 5 |
| 40 | Methanol | B | [2] 1 | 82 | 5 |
| 41 | do | B | [3] 1 | 100 | 6 |
| 42 | do | B | [4] 1 | 100 | 6 |
| 43 | do | A | [1] 1 | 100 | 14 |
| 44 | do | A | | 100 | 14 |
| 45 | do | B | [1] 1 | 100 | 6 |
| 46 | do | B | [1] 1 | 100 | 6 |
| 47 | i-Propanol | A | | 120 | 15 |
| 48 | do | A | | 101 | 12.5 |

[1] The reducing agent was benzoin.
[2] The reducing agent was stannous chloride.
[3] The reducing agent was 2,6-di-tert. butyl-p-cresol.
[4] The reducing agent was benzaldehyde.

Note.—Catalyst A = CuCl₂·2H₂O; Catalyst B· FeCl₃·CH₂O.

TABLE III.—PROPERTIES AND ANALYSES OF VARIOUS OF ADDUCTS FORMED

Examples 32–47

| Product of Example | Boiling point, ° C. | Refraction index, $n_D^{25}$ | Percent [1] | | |
|---|---|---|---|---|---|
| | | | Cl | C | H |
| 32 | 84 (0.1 mm.) | 1.5523 | 54.0 (54.95) | 42.0 (41.9) | 3.0 (3.1) |
| 33 | 110 (25 mm.) | 1.5042 | 67.2 (68.2) | 29.3 (28.9) | 2.9 (2.9) |
| 34 [2] | 111 (25 mm.) | 1.4931 | 67.7 (68.5) | 23.5 (23.2) | 1.5 (1.5) |
| 35, 36 | 111 (20 mm.) | 1.4819 | 57.65 (59.1) | 25.8 (25.0) | 2.4 (2.5) |
| 37 | 66 (1.0 mm.) | 1.5066 | 67.2 (66.9) | 23.1 (22.7) | 2.7 (2.85) |
| 38–42 | 87 (25 mm.) | 1.4779 | 68.1 (67.6) | 28.8 (28.6) | 3.9 (3.8) |
| 43–45 | 93 (25 mm.) | 1.4869 | 67.1 (67.6) | 29.3 (28.6) | 3.7 (3.8) |
| 46 | 70 (0.8 mm.) | 1.4749 | 52.0 (53.3) | | |
| 47 | 122 (25 mm.) | 1.4713 | 54.4 (55.8) | | |

[1] Calculated values in parenthesis.
[2] Nitrogen found: 6.8%; calculated (6.8%).

EXAMPLES 49–56—CHCl₃ ADDUCTS

A number of additional reactions were carried out, forming adducts of various olefinically unsaturated materials with chloroform. Each example involved the reaction of 0.1 mole of the unsaturated material with 0.3 mole of chloroform in the presence of 0.2 mole of solvent and 2 millimoles of the designated catalyst. In each of the following examples, save for Example 55, diethylammonium chloride was incorporated in the reaction medium. The diethylammonium chloride was incorporated in the amount of 4 millimoles per 0.1 mole of the olefinically unsaturated compound in Examples 49 and 54, in the amount of 1.5 millimoles per 0.1 mole of the olefinically unsaturated compound in Examples 50–53, and in the amount of 3 millimoles per 0.1 mole of the olefinically unsaturated compound in Example 56.

Tables IV–VI below are similar in form to Tables I–III, recording the corresponding data for Examples 49–56, inclusive:

TABLE IV.—REACTANTS AND ADDUCTS FORMED

Examples 49-56

| Example | Unsaturated compound | Product | Percent Selectivity | Yield |
|---|---|---|---|---|
| 49 | Octene-1 | $CHCl_2$-$CH_2$-$CH(Cl)$-$C_6H_{13}$ | 80 | 72 |
| 50 | do | Same as above | 80 | 84 |
| 51 | Butene-1 | $CHCl_2$-$CH_2$-$CH(Cl)$-$C_2H_5$ | 80 | 85 |
| 52 | do | Same as above | 80 | 40 |
| 53 | Butene-2 | $CH_3$-$CH(CHCl_2)$-$CHCl$-$CH_3$ | 80 | 26 |
| 54 | Styrene | $CHCl_2CH_2$-$CH(Cl)$-$C_6H_5$ | 60 | 7.5 |
| 55 | do | Same as above | 60 | 38 |
| 56 | Trans-butene-2 | $CHCl_2$-$CH(CH_3)$-$CH(CH_3)Cl$ | 95 | [1] 68 |

[1] The product was a mixture of diasteriosisomers—some unisomerized butene-2 remaining after reaction.

TABLE V.—REACTION CONDITIONS

Examples 49-56

| Example | Solvent | Catalyst | Reducing agent (mmoles) | Temp. (° C.) | Time (hrs.) |
|---|---|---|---|---|---|
| 49 | Methanol | C | | 140 | 22 |
| 50 | do | B | 2 | 130 | 15 |
| 51 | do | B | 2 | 130 | 15 |
| 52 | do | B | | 130 | 15 |
| 53 | Acetonitrile | B | 1 | 101 | 20 |
| 54 | do | A | | 160 | 15 |
| 55 | do | B | 2 | 126 | 15 |
| 56 | do | B | 2 | 143 | 23 |

NOTE.—Catalyst A=$CuCl_2 \cdot 2H_2O$; Catalyst B=$FeCl_3 \cdot 6H_2O$; Catalyst C=$FeCl_2 \cdot 4H_2O$.

TABLE VI.—PROPERTIES AND ANALYSES OF ADDUCTS FORMED

Examples 49-56

| Product of Example | Boiling point, ° C. | Refraction index, $n_d^{25}$ | Percent [1] Cl | C | H |
|---|---|---|---|---|---|
| 49 | 90 (0.5 mm.) | 1.4635 | 44.9 (46.0) | 47.0 (46.7) | 7.4 (7.4) |
| 50 | 90 (0.5 mm.) | 1.4635 | 44.9 (46.0) | 47.0 (46.7) | 7.4 (7.4) |
| 51 | 75 (25 mm.) | 1.4619 | 60.2 (60.6) | 34.2 (34.2) | 5.1 (5.2) |
| 52 | 75 (25 mm.) | 1.4619 | 60.2 (60.6) | 34.2 (34.2) | 5.1 (5.2) |
| 53 | 76 (25 mm.) | 1.4683 | 60.5 (60.6) | 34.15 (34.2) | 5.4 (5.2) |
| 54 | 62 (0.1 mm.) | 1.5477 | 45.5 (47.6) | 49.1 (48.35) | 4.1 (4.1) |
| 55 | 62 (0.1 mm.) | 1.5477 | 45.5 (47.6) | 49.1 (48.35) | 4.1 (4.1) |
| 56 | 76 (25 mm.) | 1.4683 | 60.5 (60.6) | 34.1 (34.2) | 5.4 (5.2) |

[1] Calculated values in parenthesis.

It will be understood that various changes may be made for example, in the several test runs referred to in Tables 1 and 2 of the aforesaid paper appearing in the Journal of the Chemical Society of March 1963, pp. 1187–1896 at 1888, 1890; and in Table 1 of the further paper appearing in the Journal of the Chemical Society of August 1963, pp. 3921–3927 at 3922.

What is claimed is:

1. A process for the production of a 1:1 adduct of carbon tetrachloride with an olefinically unsaturated material, which comprises reacting carbon tetrachloride with an alkene having from 2 to 8 carbon atoms, butadiene, styrene, acrylonitrile, or natural latex rubber; and maintaining the reactants in a substantially homogeneous reaction medium consisting essentially of an inert organic solvent having copper chloride dissolved as the sole catalyst therein.

2. The process of claim 1, wherein the olefinically unsaturated material reacted is a lower alkene having from 2 to 8 carbon atoms.

3. The process of claim 1, wherein the olefinically unsaturated material reacted is butadiene.

4. The process of claim 1, wherein the olefinically unsaturated material reacted is styrene.

5. The process of claim 1, wherein the olefinically unsaturated material reacted is natural latex rubber.

6. The process of claim 1, wherein the substantially homogeneous reaction medium incorporates diethylammonium chloride for solubilizing the copper chloride catalyst.

7. A process for the production of a 1:1 adduct of chloroform with styrene, which comprises reacting said materials in a substantially homogeneous reaction medium consisting essentially of an inert organic solvent having copper chloride dissolved as the sole catalyst therein.

8. The process of claim 7, wherein the substantially homogeneous reaction medium incorporates diethylammonium chloride for solubilizing the copper chloride catalyst.

References Cited

UNITED STATES PATENTS

| | | | |
|---|---|---|---|
| 2,297,564 | 9/1942 | Kirkbride | 260—652 |
| 2,379,097 | 6/1945 | Niederhauser et al. | 260—658 C X |
| 2,401,099 | 5/1946 | Peterson | 260—654 |
| 2,410,541 | 11/1946 | Joyce | 260—654 |
| 2,440,800 | 5/1948 | Hanford et al. | 260—658 C |
| 2,658,930 | 11/1953 | Thompson | 260—658 C |
| 2,689,873 | 9/1954 | Niederhauser | 260—654 |
| 2,720,548 | 10/1955 | Craig et al. | 260—611 A |
| 3,213,149 | 10/1965 | Takahashi et al. | 260—658 C |
| 3,454,657 | 7/1969 | Decker et al. | 260—651 |

FOREIGN PATENTS

| | | | |
|---|---|---|---|
| 1,036,847 | 8/1958 | Germany | 260—648 |
| 570,869 | 7/1945 | Great Britain | 260—658 C |
| 803,465 | 10/1958 | Great Britain | 260—658 C |
| 244,066 | 1/1960 | Australia | 260—658 C |
| 13,845 | 11/1961 | Israel | 260—658 C |

OTHER REFERENCES

Asscher et al. "J. Chem. Soc." 1961, pp. 2261–64. QD1.C6.

Kern et al. "Makromol. Chem." vol. 13, pp. 210–22 (1954). QD281.P6.M2.

Kharasch et al. "J. Am. Chem. Soc." vol. 69, pp. 1100–1105 (1947). QD1.A5.

Thomas. "Anhydrous Aluminum Chloride." (1941) pp. 775–78 QD 262.T5.

BERNARD HELFIN, Primary Examiner

J. A. BOSKA, Assistant Examiner

U.S. Cl. X.R.

260—94.7, 453 AL, 465.7, 539 R, 561 HL, 633, 648 R, 648 C, 654 R, 651 R, 658 C